US012728313B2

(12) United States Patent
Clearwater

(10) Patent No.: US 12,728,313 B2
(45) Date of Patent: Sep. 8, 2026

(54) SYSTEMS AND METHODS FOR SINGLE MOBILE DEVICE LAUNCH MONITOR AND MOTION CAPTURE

(71) Applicant: GOLFTEC ENTERPRISES LLC, Englewood, CO (US)

(72) Inventor: Nick Clearwater, Englewood, CO (US)

(73) Assignee: GOLFTEC ENTERPRISES LLC, Englewood, CO (US)

( * ) Notice: Subject to any disclaimer, the term of this patent is extended or adjusted under 35 U.S.C. 154(b) by 265 days.

(21) Appl. No.: 18/393,914

(22) Filed: Dec. 22, 2023

(65) Prior Publication Data

US 2025/0205550 A1 Jun. 26, 2025

(51) Int. Cl.

*A63B 24/00* (2006.01)
*A63B 71/06* (2006.01)
*A63B 102/32* (2015.01)
*G06T 7/292* (2017.01)
*G06T 7/60* (2017.01)

(52) U.S. Cl.

CPC ...... *A63B 24/0003* (2013.01); *A63B 71/0622* (2013.01); *G06T 7/292* (2017.01); *G06T 7/60* (2013.01); *A63B 2024/0034* (2013.01); *A63B 2071/0627* (2013.01); *A63B 2102/32* (2015.10); *A63B 2220/05* (2013.01); *A63B 2220/806* (2013.01); *A63B 2220/83* (2013.01); *G06T 2207/30224* (2013.01); *G06T 2207/30241* (2013.01)

(58) Field of Classification Search

CPC .... G06V 40/23; G06V 20/42; A63B 24/0003; A63B 69/36; A63B 71/0622; A63B 2220/803; A63B 24/0062; A63B 60/46; A63B 24/0021; A63B 2220/30; A63B 2024/0053; A63B 69/3632; A63B 2024/0028; A63B 69/3605; A63B 2102/32; A63B 2220/20; A63B 2220/807; A63B 2220/05; A63B 2024/0015; A63B 69/3667; A63B 2024/0034; A63B 2071/0627; A63B 2220/806; A63B 2220/83; H04N 7/183; H04N 7/181; H04N 23/64; G06T 2207/30224; G06T 2207/30221; G06T 7/20; G06T 2207/30241; G06T 7/246; G06T 7/292; G06T 7/60

See application file for complete search history.

(56) References Cited

U.S. PATENT DOCUMENTS

| | | | | |
|---|---|---|---|---|
| 8,941,723 B2 * | 1/2015 | Bentley | A61B 5/6895 348/47 |
| 10,186,041 B2 * | 1/2019 | Chang | G06V 40/23 |
| 10,605,910 B2 * | 3/2020 | Du Toit | G01S 7/003 |
| 2008/0139330 A1 * | 6/2008 | Tuxen | A63B 69/3658 473/409 |
| 2014/0127659 A1 | 5/2014 | Barasch et al. | |

(Continued)

*Primary Examiner* — Courtney Joan Nelson
(74) *Attorney, Agent, or Firm* — Haynes and Boone, LLP

(57) ABSTRACT

A system for determining the trajectory of a sport object propelled via an implement using a single mobile device includes a single mobile device and a sensor in the single mobile device. The system further includes a swing radius module, the swing radius module calculating a swing radius of an implement swung by a user. The system further includes a notification module, the notification module providing a notification to the user that the swing radius is outside of a viewing frame of the sensor.

19 Claims, 14 Drawing Sheets

(56) References Cited

U.S. PATENT DOCUMENTS

| | | | | |
|---|---|---|---|---|
| 2014/0257538 | A1 * | 9/2014 | Rose .................. | A63B 24/0006 473/409 |
| 2017/0259151 | A1 | 9/2017 | Kierath et al. | |
| 2020/0398138 | A1 | 12/2020 | Hendrix et al. | |
| 2021/0089761 | A1 | 3/2021 | Tyomkin | |
| 2023/0267768 | A1 | 8/2023 | Menaker et al. | |
| 2023/0381584 | A1 | 11/2023 | Lee | |

* cited by examiner

P5 - Downswing (a)
100
110
120

P6 - Downswing (b)

P7 - Impact

P8 - Release (a)

SYSTEMS AND METHODS FOR SINGLE MOBILE DEVICE LAUNCH MONITOR AND MOTION CAPTURE

BACKGROUND

Golf is a game that involves a golfer hitting a ball with a club. Numerous variables can be measured that describe the movement of the golfer, the club, and the ball. Other variables can be derived from the measurements. In various scenarios, it is desirable to calculate the trajectory of a sports object such as a golf ball. Calculating the trajectory of a golf ball may be helpful to a golfer for, among other things, training and swing improvement. Users, however, may be limited in terms of the equipment available for such motion capture in a home environment. Traditional launch monitor set ups can also be cost prohibitive for many golfers. One of the most common resources available to users is their smartphone. However, placement and camera limitations may make the use of smartphones difficult to use for such a purpose.

SUMMARY

Disclosed is a Single Mobile Device Launch Monitor and Motion Capture (SMoDLaM) system which is capable of imaging and analyzing a golf swing using an ordinary smartphone or tablet. The SMoDLaM disclosed herein has particular, but not exclusive, utility for golf instruction.

In one embodiment, a system for determining the trajectory of a sport object propelled via an implement using a single mobile device includes a single mobile device and a sensor in the single mobile device. The system further includes a swing radius module, the swing radius module calculating a swing radius of an implement swung by a user. The system further includes a notification module, the notification module providing a notification to the user that the swing radius is outside of a viewing frame of the sensor.

In another embodiment, a system for determining the trajectory of a sport object propelled via an implement using a single mobile device includes a single mobile device. The system further includes a first sensor in the single mobile device and a second sensor in the single mobile device, wherein a first-second inter-sensor distance between the first sensor and the second sensor is known. The system further includes a trajectory module configured to correlate images from the first sensor and the second sensor using the first-second inter-sensor distance. Alternatively, a first magnification of the first sensor and a second magnification of the second sensor is known and the first and second magnification are used by the trajectory module in correlating the images.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the SMODLaM, as defined in the claims, is provided in the following written description of various embodiments of the disclosure and illustrated in the accompanying drawings.

DETAILED DESCRIPTION

Figures 1, 2, 3, 4:
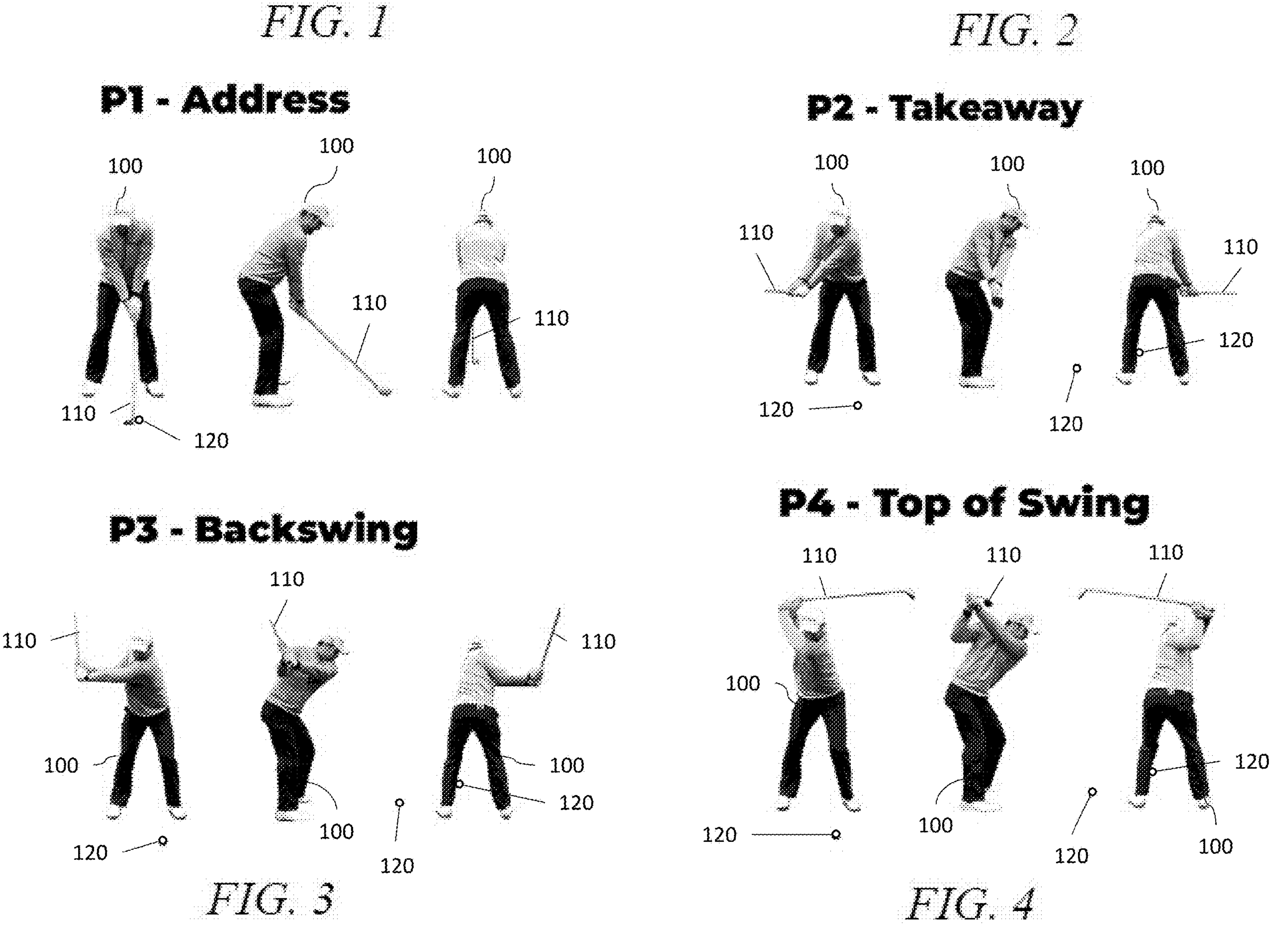
FIG. 1 shows three views of a golfer 100 swinging a golf club 110 at a golf ball 120, where the swing is in the P1 phase or address phase.
FIG. 2 shows three views of a golfer 100 swinging a golf club 110 at a golf ball 120, where the swing is in the P2 phase or takeaway phase.
FIG. 3 shows three views of a golfer 100 swinging a golf club 110 at a golf ball 120, where the swing is in the P3 phase or backswing phase.
FIG. 4 shows three views of a golfer 100 swinging a golf club 110 at a golf ball 120, where the swing is in the P4 phase or top of swing phase.

Disclosed is a Single Mobile Device Launch Monitor and Motion Capture (SMoDLaM) system which is capable of imaging and analyzing a golf swing using an ordinary smartphone or tablet. As is known in the art of golf instruction, a typical golf swing contains 10 separate positions, P1-P10: P1—the Address; P2—the Takeaway, P3—Backswing, P4—Top of Swing, P5—the Downswing (or transition), P6—Preimpact—the club position prior to impact, P7—Impact, P8—Release, P9, P10—Finish—final position of the club. These 10 positions may be instructive in the current application as they also define the swing radius of a golf swing.

Certain terminology is used herein for convenience only and is not to be taken as a limitation on the embodiments of the Systems and Methods for Single Mobile Device Launch Monitor and Motion Capture (SMoDLaM). In many embodiments, systems and methods include a notification system for notifying a user of a misalignment of the single mobile device. In many configurations, the single mobile device is a smart phone or tablet. In some alternatives, the device includes a pre-swing detection system, where the SMODLaM includes a club length detection module. The club length detection module automatically calculates the length of the club and the length of the user's arms and predicts a swing radius for the club. The swing radius is based on the initial position of the user's hands (e.g., wrists), a calculated, estimated or default arm length, a calculated, estimated or default club length, and an expected radius of travel. The club length may be determined by identifying the position of the ball using expected visual artifacts and heuristic rules for typical golf swing setup. One such heuristic is that during the setup stage, a light contrasting object (e.g., the golf ball) will be located at the end of a thin linear diagonal line (e.g., the golf club extending to the floor). The end of the club is where the user grips the club so the club length can be determined to stretch from the ball to the point where the thin diagonal line becomes irregular (e.g., where the user grips the club). The length of the arms can be identified by using the heuristics of the shoulders, where the upper point where the body becomes more narrow, before the rounded top portion. Based on the length of the arms and the length of the club, an expected radius of swing may be determined. Typically, a margin for error is included as well, to ensure that the entire swing is captured.

If the expected swing radius does not fall within viewing frame of the camera of the single mobile device, then a notification is issued to the user to correct the positioning. This notification may be auditory or visual, such as the beep of the smart phone of the flashing of the screen or a camera. In this way, the user may reposition the device to ensure the swing is captured in viewing frame of the camera.

In another embodiment, the SMoDLaM provides enhanced processing of ball speed, ball spin rate and ball spin direction. Additional aspects of the golf ball and golf swing may also be calculated by the SMODLaM, including, but not limited to: Club Head Speed; Launch Angle; Total Spin; Carry; Total Distance; Offline; Descent Angle; Side Angle (azimuth); Peak Height; or Smash Factor.

In many configurations, a single mobile device will include numerous camera lens/capture devices. For instance, the currently release Samsung S23, includes primary camera having 50 MP, an ultrawide camera of 12 MP, and a times 3 telephoto lens of 10 MP. One or more cameras may have a frame rate of 60 frames per second (fps). Based on the usage of multiple cameras additional resolution may be obtained concerning the spin and velocity of the ball that is struck. The distance between the cameras and the relative magnification can be known and therefore used in correlating images from the cameras to better determine the launch trajectory of the ball.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

The present disclosure aids substantially in the analysis and improvement of golf swings, by improving the ability for detailed motion capture and associated calculations to be performed with an ordinary mobile device such as a smartphone or tablet. Implemented on a processor in communication with one or more imaging sensors, the Single Mobile Device Launch Monitor and Motion Capture (SMoDLaM) disclosed herein provides practical instruction information to both novice and expert users. This improved/augmented accessibility transforms a user's ordinary golf swing into one that has been subjected to detailed analysis, without the normally routine need to purchase or rent a dedicated flight monitor. This unconventional approach improves the functioning of the mobile device, by enabling it to perform functions normally reserved for specialized sports analysis devices.

The SMODLaM may be implemented as a process at least partly viewable on a display, and operated by a control process executing on a processor that accepts user inputs from a keyboard, mouse, or touchscreen interface, and that is in communication with one or more imaging sensors. In that regard, the control process performs certain specific operations in response to different inputs or selections made at different times. Outputs of the SMODLaM may be printed, spoken, shown on a display, or otherwise communicated to human operators. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the SMODLaM. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 shows three views of a golfer 100 swinging a golf club 110 at a golf ball 120, where the swing is in the P1 phase or address phase. In the address phase, the golfer places the face of the club gently against the ball in order to line up the shot.

FIG. 2 shows three views of a golfer 100 swinging a golf club 110 at a golf ball 120, where the swing is in the P2 phase or takeaway phase. In the takeaway phase, the golfer removes the face of the club from the ball.

FIG. 3 shows three views of a golfer 100 swinging a golf club 110 at a golf ball 120, where the swing is in the P3 phase or backswing phase. In the backswing phase, the golfer lifts the club in order to gain distance for the shot.

FIG. 4 shows three views of a golfer 100 swinging a golf club 110 at a golf ball 120, where the swing is in the P4 phase or top of swing phase. In the top of swing phase, the club is motionless at the top of its arc, preparing to swing downward to contact the ball 120.

Figures 5, 6, 7, 8:
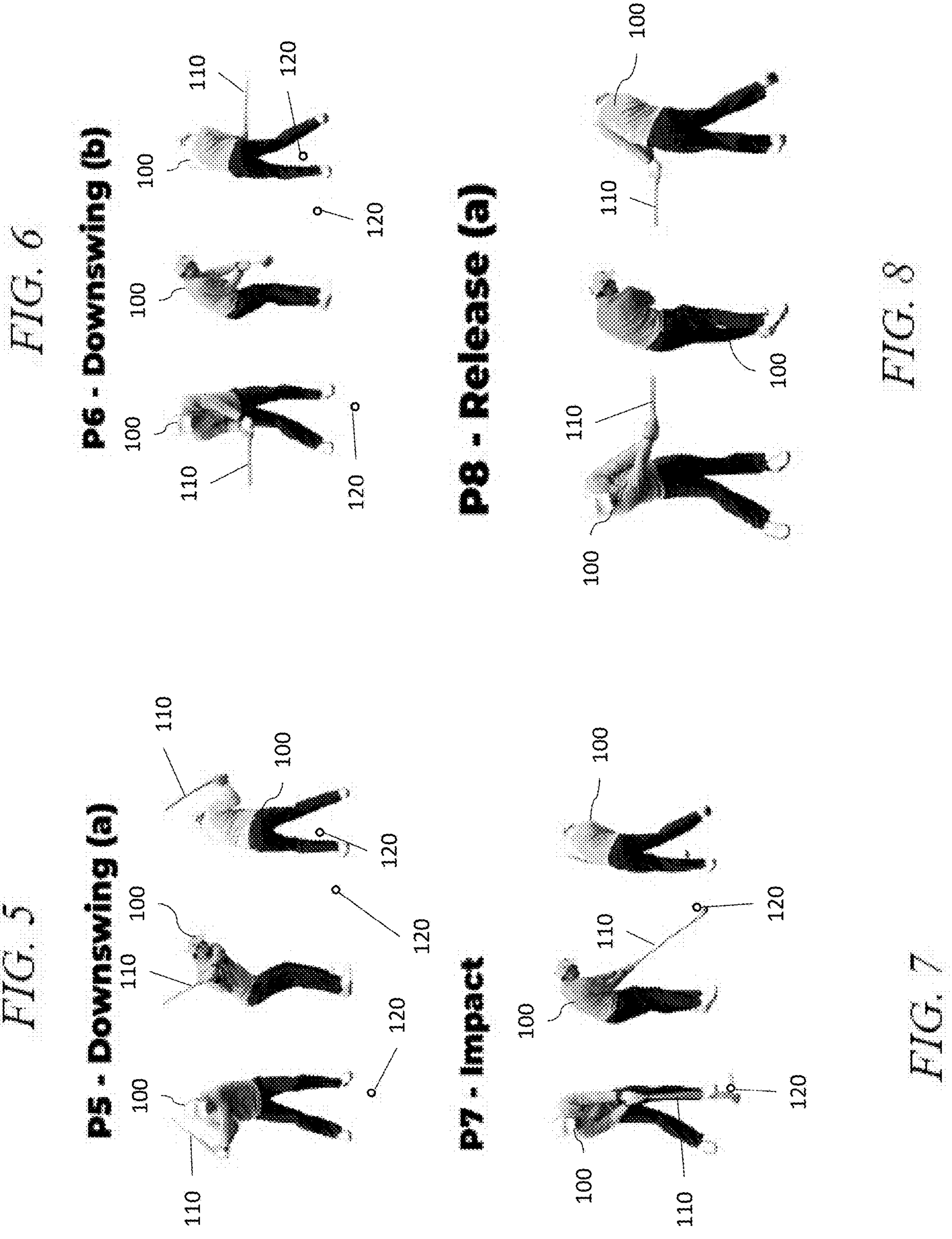
FIG. 5 shows three views of a golfer 100 swinging a golf club 110 at a golf ball 120, where the swing is in the P5 phase or downswing (a) phase.
FIG. 6 shows three views of a golfer 100 swinging a golf club 110 at a golf ball 120, where the swing is in the P6 phase or downswing (b) phase.
FIG. 7 shows three views of a golfer 100 swinging a golf club 110 at a golf ball 120, where the swing is in the P7 phase or impact phase.
FIG. 8 shows three views of a golfer 100 swinging a golf club 110 at a golf ball 120, where the swing is in the P8 phase or release (a) phase.

FIG. 5 shows three views of a golfer 100 swinging a golf club 110 at a golf ball 120, where the swing is in the P5 phase or downswing (a) phase. In the downswing (a) phase, the golfer accelerates the club face downward toward the ball 120.

FIG. 6 shows three views of a golfer 100 swinging a golf club 110 at a golf ball 120, where the swing is in the P6 phase or downswing (b) phase. In the downswing (b) phase, the golfer accelerates the club face laterally toward the ball 120.

FIG. 7 shows three views of a golfer 100 swinging a golf club 110 at a golf ball 120, where the swing is in the P7 phase or impact phase. In the impact phase, the moving club face contacts the ball 120.

FIG. 8 shows three views of a golfer 100 swinging a golf club 110 at a golf ball 120, where the swing is in the P8 phase or release (a) phase. In the release (a) phase, the ball 120 accelerates away from the club face.

Figure 9:
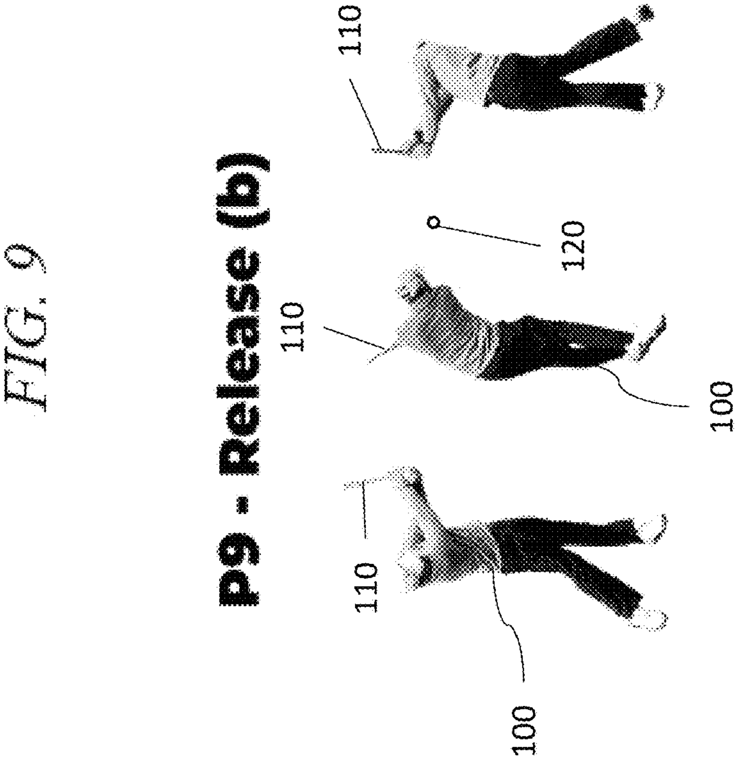
FIG. 9 shows three views of a golfer 100 swinging a golf club 110 at a golf ball 120, where the swing is in the P9 phase or release (b) phase.

FIG. 9 shows three views of a golfer 100 swinging a golf club 110 at a golf ball 120, where the swing is in the P9 phase or release (b) phase. In the Release (b) phase, the golfer decelerates the club face as it rises through its swing arc.

Figure 10:
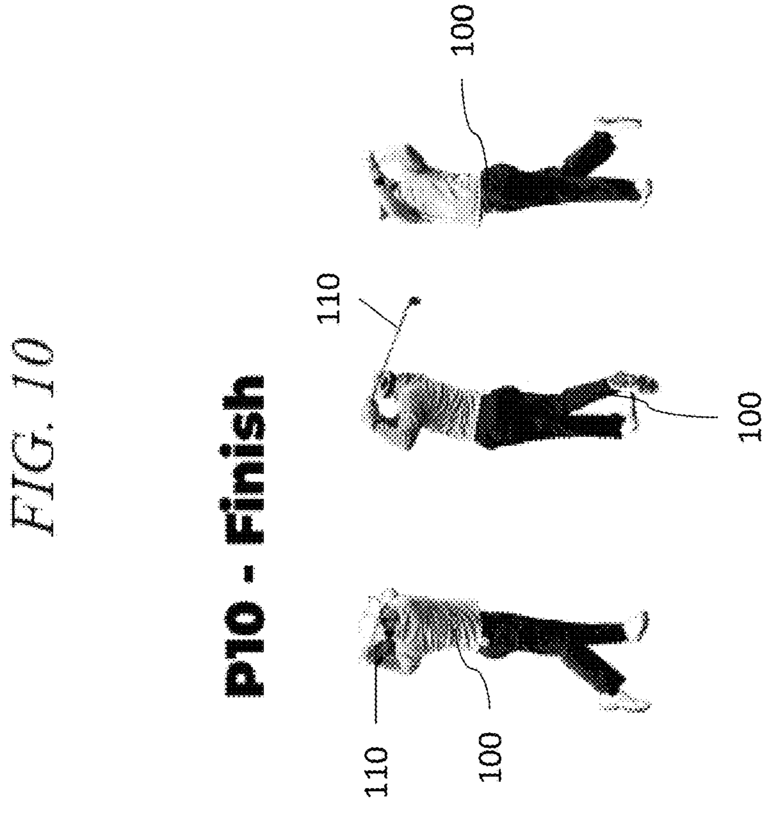
FIG. 10 shows three views of a golfer 100 swinging a golf club 110 at a golf ball 120, where the swing is in the P10 phase or finish phase.

FIG. 10 shows three views of a golfer 100 swinging a golf club 110 at a golf ball 120, where the swing is in the P10 phase or finish phase. In the finish phase, the club 110 is again motionless at the top of its arc.

Figure 11:
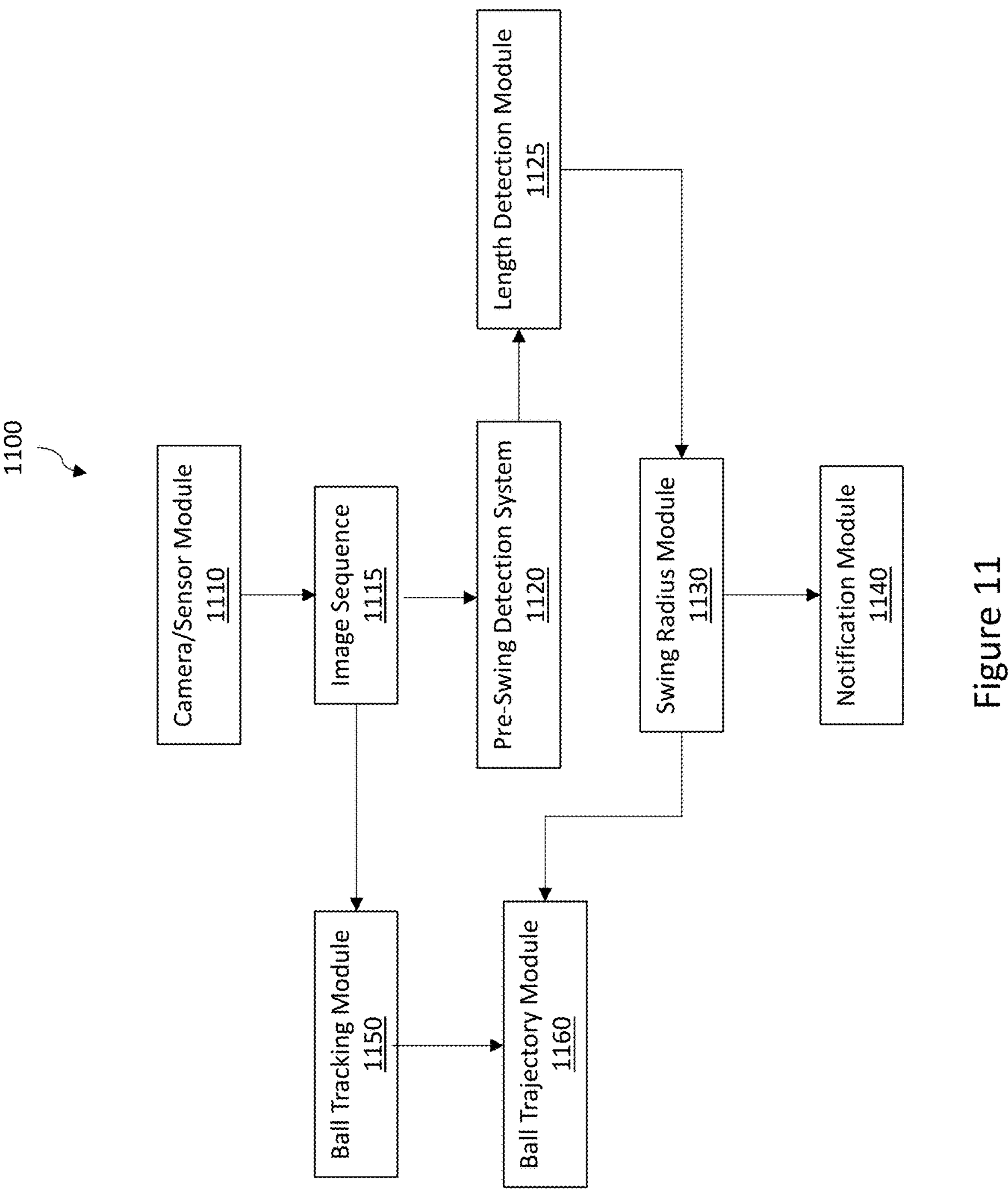
FIG. 11 is a schematic, diagrammatic representation of a Single Mobile Device Launch Monitor and Motion Capture (SMODLaM), in accordance with at least one embodiment of the present disclosure.

FIG. 11 is a schematic, diagrammatic representation of a Single Mobile Device Launch Monitor and Motion Capture (SMoDLaM) 1100, in accordance with at least one embodiment of the present disclosure. The SMODLaM 1100 may for example be software executing on a mobile device such as a smartphone or tablet, although in some embodiments the software may execute on other hardware platforms including but not limited to laptop, notebook, desktop, mainframe, or server computers, smartwatches, smart glasses, and otherwise. Furthermore, some portions of the SMoDLaM 1100 may comprise firmware or hardware in place of software, or combinations of hardware, software, and/or firmware that accomplish the same or a similar function.

The SMoDLaM 1100 includes a camera module or sensor module 1110 that receives data (e.g., 2D or 3D image data or point cloud data) from a sensor such as a camera or depth sensor. The data may for example include a sequence of images 1115 (e.g., a 60-Hz or 60 frame-per-second video) of the golfer, golf club, and ball during a golf swing. In some embodiments, the data is received from multiple cameras or other sensors.

The SMoDLaM 1100 also includes a pre-swing detection system 1120 that includes a length detection module 1125. The length detection module 1125 receives the image sequence 1115, or a portion thereof, and automatically calculates the length of the club and the length of the user's arms. In a non-limiting example, the club length may be determined by identifying the position of the ball using expected visual artifacts and heuristic rules for typical golf swing setup. One such heuristic is that during the setup stage, a light contrasting object (e.g., the golf ball) will be located at the end of a thin linear diagonal line (e.g., to the floor or green). The end of the club is where the user grips the club so the club length can be determined to stretch from the ball to the point where the thin diagonal line becomes irregular (e.g., where the user grips the club). The length of the arms can be identified by using the heuristics of the shoulders, the upper point where the body becomes more narrow, before the rounded top portion.

The length detection module 1125 passes the club length and/or the length of the user's arms and passes this information to a swing radius module 1130 that predicts a swing radius for the club. In a non-limiting example, the swing radius is based on the initial position of the user's hands, a calculated, estimated, measured, or default arm length, a calculated, estimated, measured, or default club length, and an expected radius of travel. Typically, a margin for error is included as well, to ensure that the entire swing is captured.

The SMoDLaM 1100 also includes a notification module 1140 that determines whether a portion of a predicted swing or the actual swing of the user (e.g., the golfer) falls outside the viewing area of the camera/sensor module 1110. If the expected swing radius does not fall within viewing frame of the camera of the single mobile device, then the notification module 1140 issues a notification to the user to correct the positioning. This notification may be auditory or visual, such as the beep of the smart phone of the flashing of the screen or a camera. The notification may include specific or generic instructions on the positioning of the mobile device, or may include only a warning that repositioning is necessary.

The SMoDLaM 1100 also includes a ball tracking module 1150 that receives the image sequence 1115 and determines the velocity of the ball after it is struck, by for example calculating the distance the ball has moved between two consecutive images in the image sequence 1115. In some embodiments, the ball tracking module also determines the spin of the ball. The accuracy and resolution of these calculations may be improved through the use of multiple cameras on the mobile device. The known distance between the cameras and the known relative magnification of each camera can be used in correlating images from the cameras to better determine the launch trajectory of the ball.

In another embodiment, the SMoDLaM provides enhanced processing of ball speed, ball spin rate and ball spin direction. Additional aspects of the golf ball and golf swing may also be calculated by the SMoDLaM, including, but not limited to: Club Head Speed; Launch Angle; Total Spin; Carry; Total Distance; Offline; Descent Angle; Side Angle (azimuth); Peak Height; or Smash Factor.

The SMoDLaM 1100 also includes a ball trajectory module 1160. The ball trajectory module 1160 predicts or simulates the trajectory of the golf ball based on the motion parameters (velocity, spin, etc.) determined by the ball trajectory module. The predicted or simulated trajectory is then communicated to the user.

In preferred embodiments, the SMODLaM 1100 is placed in certain preferred locations around a golfer, such as, for example, orthogonal, above or behind a golfer, etc., in order to capture the most accurate information from a golf swing. In other embodiments, the location and/or placement of the SMODLaM 1100 around a golfer is immaterial to the accuracy of information collected about a golf swing.

It is noted that block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein. Any of the steps or modules described herein may optionally include an output to a user of information relevant to the step, and may thus represent an improvement in the user interface over existing art by providing information not otherwise available to the user. In order to execute the steps, blocks, modules, or methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, capturing motion parameters of a golf swing may involve capturing images less than 20 milliseconds apart, and preferably less than 10 milliseconds apart.

Before continuing, it should be noted that the examples described herein are provided for purposes of illustration, and are not intended to be limiting. Other devices and/or device configurations may be utilized to carry out the operations described herein.

Figure 12:
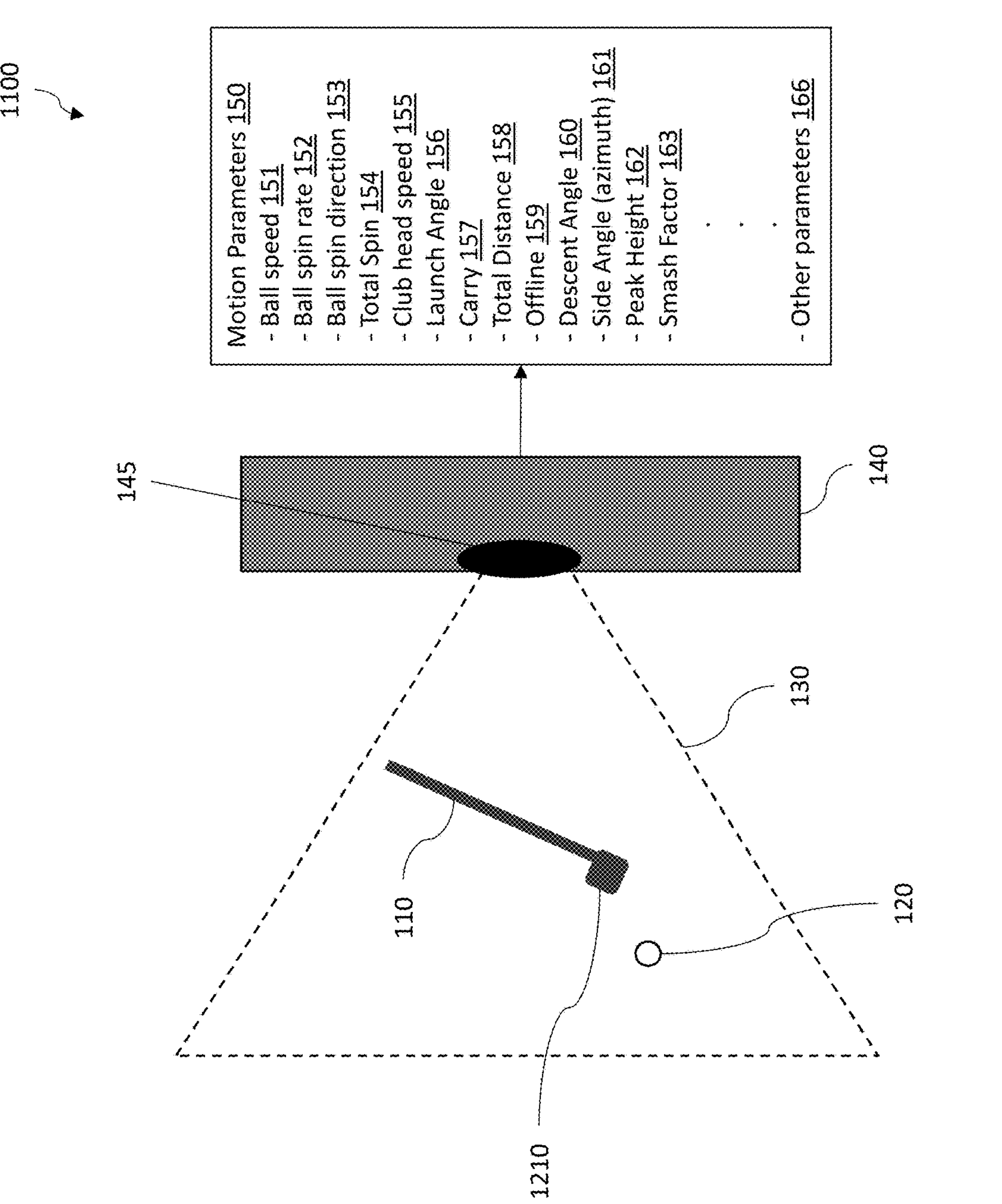
FIG. 12 is a schematic, diagrammatic representation, in block diagram form, of at least a portion of an example Single Mobile Device Launch Monitor and Motion Capture (SMoDLaM), in accordance with at least one embodiment of the present disclosure.

FIG. 12 is a schematic, diagrammatic representation, in block diagram form, of at least a portion of an example of a 1100, in accordance with at least one embodiment of the present disclosure. Visible is a golf ball 120 being struck by a golf club 110 with a club face 1210, where at least a portion of the club 110 falls within the sensor viewing region 130 of a sensor 145 of a mobile device 140.

As noted above, it is possible to predict several motion parameters 150 (otherwise known as initial conditions, flight parameters, launch characteristics, etc.) at the time of ball impact based on the sequence of images captured by the sensor 145. These motion parameters 150 include: ball speed 151, ball spin rate 152, ball spin direction 153, total spin 154, club head speed 155, launch angle 156, carry 157, total distance 158 offline 159, descent angle 160, side angle or azimuth 161, peak height 162, smash factor 163, and/or other parameters 166 as needed depending on the implementation.

Figure 13:
FIG. 13 is a side perspective view of a user 100 (e.g., a golfer) hitting a golf ball with a golf club, within view of a Single Mobile Device Launch Monitor and Motion Capture (SMoDLaM), in accordance with at least one embodiment of the present disclosure.

FIG. 13 is a side perspective view of a user 100 (e.g., a golfer) hitting a golf ball 120 with a golf club 110, within view of a SMoDLaM 1100, in accordance with at least one embodiment of the present disclosure. When the golfer 100 strikes the ball 120 with the club 110, the ball 120 is launched (e.g., across a fairway or toward a net or catching screen), and the SMoDLaM 1100 operating on the mobile device 140 detects the motion, captures a sequence of images, and performs the calculations as described above.

Also visible is a golfer kinematic model 1300. The golfer kinematic model may include position and orientation of the shoulders 1310 and wrists 1320 as described above. However, the golfer kinematic model 1300 may additionally include position and orientation of the neck, upper arms, elbows, forearms, spine, hips, upper legs, knees, and lower legs. This kinematic model may be used in conjunction with heuristic rules as described above, to help determine the motion parameters.

Figure 14:
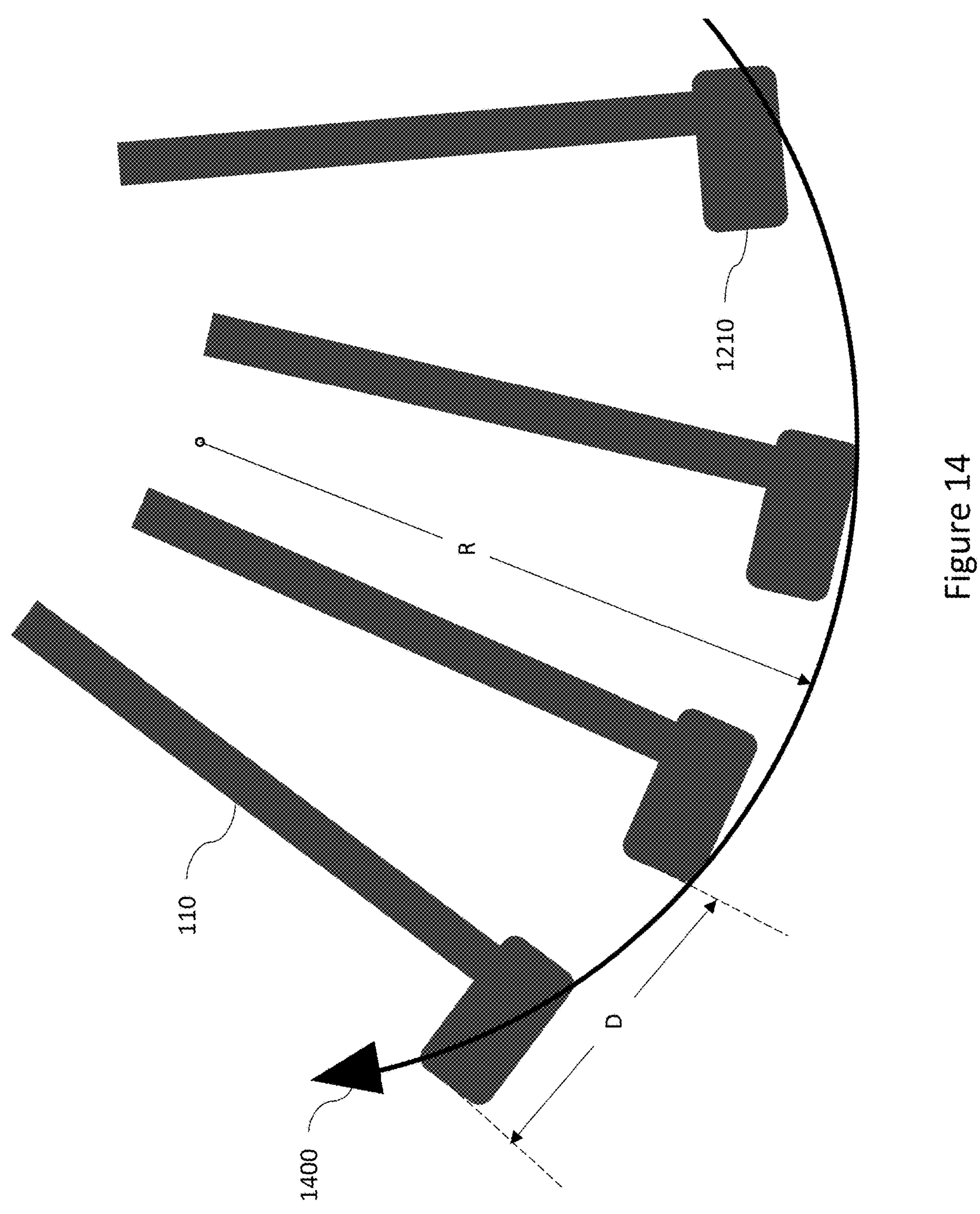
FIG. 14 is a schematic, diagrammatic view of a golf club swinging through an arc, in accordance with at least one embodiment of the present disclosure.

FIG. 14 is a schematic, diagrammatic view of a golf club 110 swinging through an arc 1400, in accordance with at least one embodiment of the present disclosure. In some embodiments, the swing radius R of the arc 1400 can be determined by analyzing the positions of the club head or club face in three or more consecutive images, fitting them to a circle, and calculating or estimating the radius of the circle. The speed of the club face or club head 1210 can be determined by measuring or estimating the positions of the club face or club head 1210 in consecutive images, measuring a distance D between the positions, and multiplying the distance D by the frame rate (e.g., 60 Hz) to obtain a speed. In some instances, the speed of the club head 1210 can exceed 140 miles per hour, which at a 60-Hz frame rate equates to a distance D of 3.4 feet per frame.

Because the frame rate and sensor field of view may be insufficient to fully capture such motion, in some embodiments, the swing radius is estimated based on the length of the club and the length of the user's arms, and the initial position of the user's hands (e.g., wrists), and the club head speed is estimated based on these same parameters and the estimated swing radius.

Figure 15:
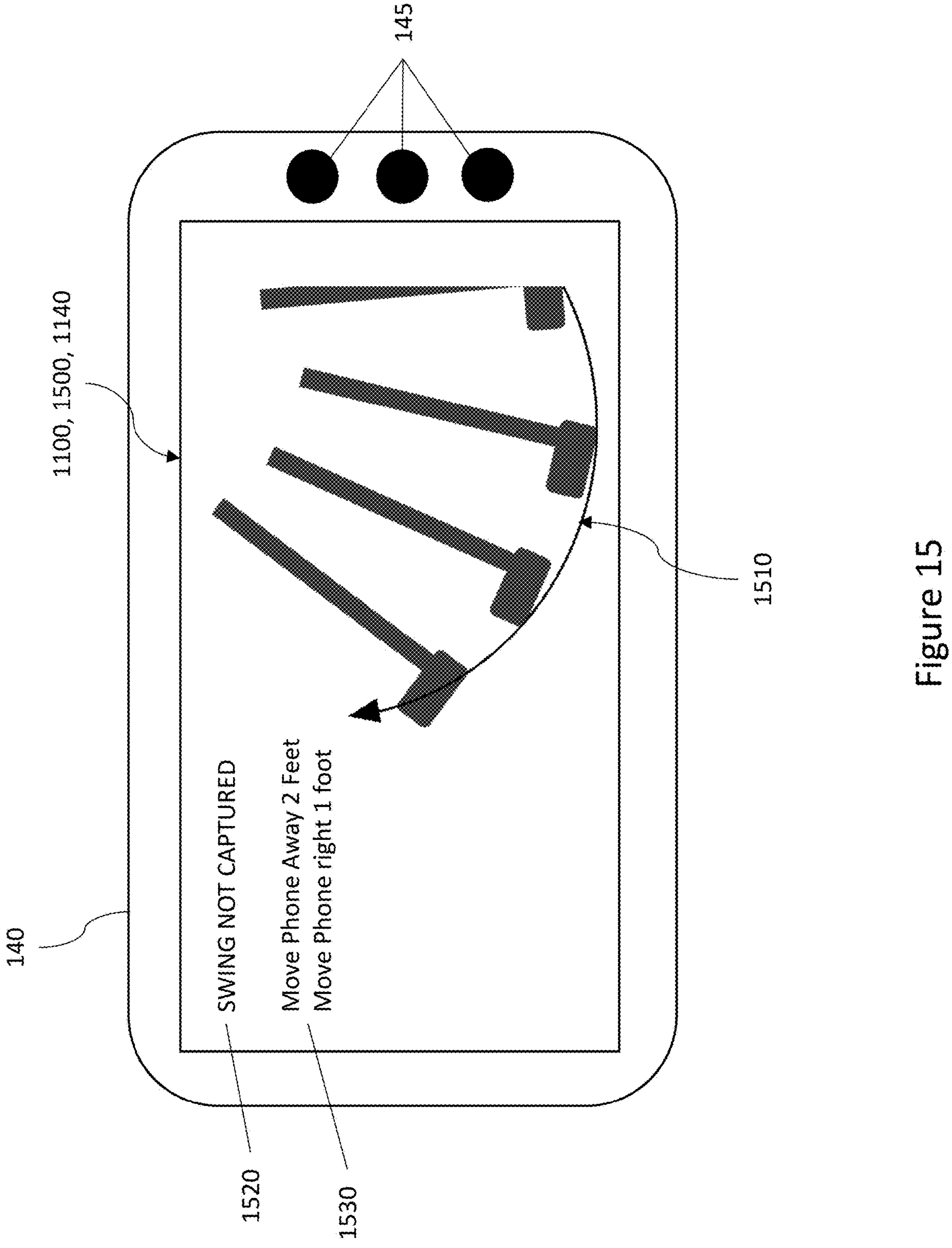
FIG. 15 is a schematic, diagrammatic view of a mobile device displaying a screen display of an example notification module of the Single Mobile Device Launch Monitor and Motion Capture, in accordance with at least one embodiment of the present disclosure.

FIG. 15 is a schematic, diagrammatic view of a mobile device 140 displaying a screen display 1500 of an example notification module 1140 of the SMODLaM 1100, in accordance with at least one embodiment of the present disclosure. The notification module 1140 provides a notification if the golfer's swing 1510, or any portion thereof, falls outside of, or is expected to fall outside of, the view of the sensor or sensors 145 of the mobile device 140. In the example shown in FIG. 15, the alert screen display 1500 includes a generic warning 1520 and specific instructions 1530. The alert may, instead or in addition, include other warning cues such as flashing lights, color changes, audible tones, haptic feedback (e.g., vibration), voice feedback, direction arrows, and otherwise.

Figure 16:
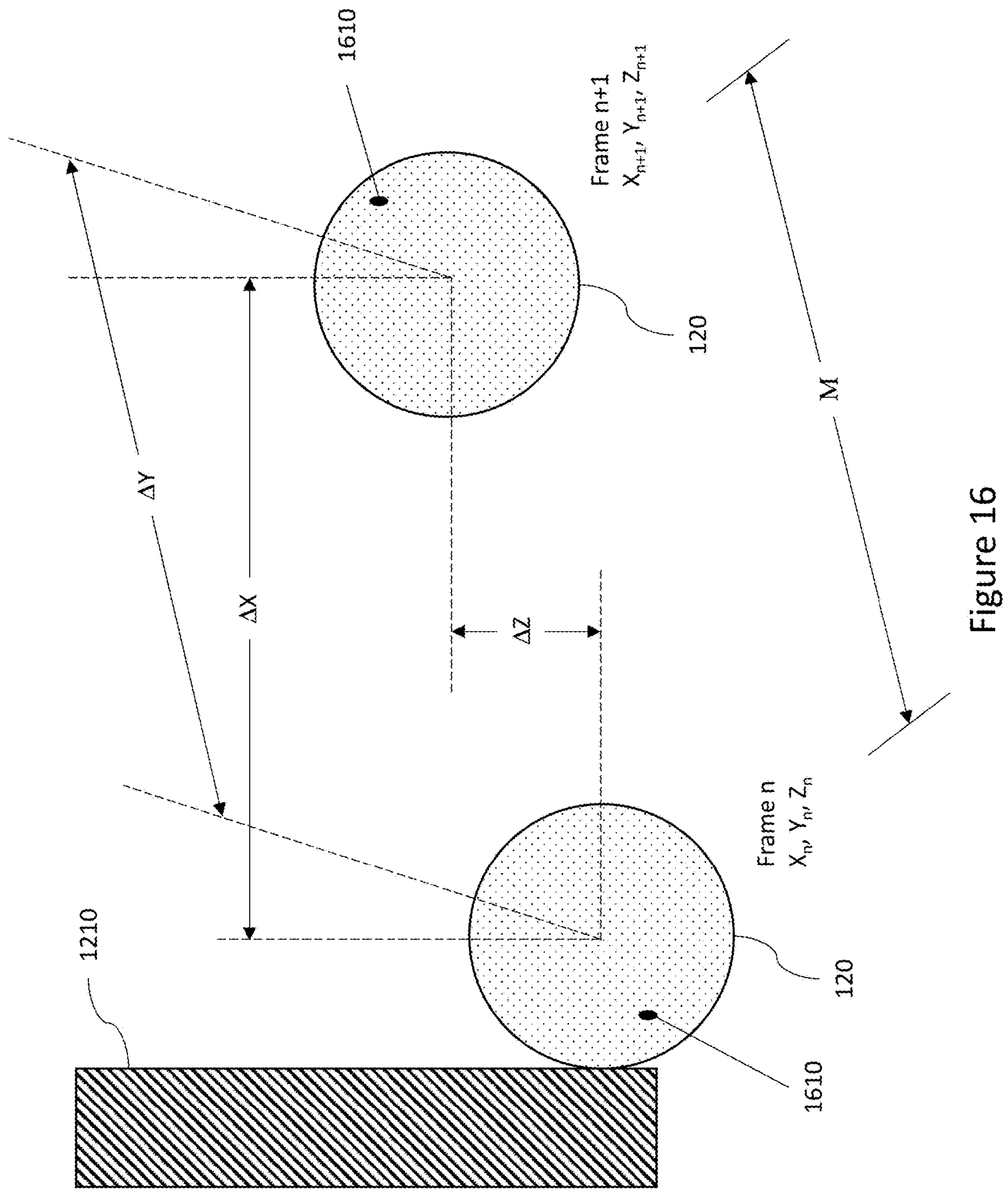
FIG. 16 is a schematic, diagrammatic view of a sports object such as a golf ball being struck by an implement such as a club head or club face, in accordance with at least one embodiment of the present disclosure.

FIG. 16 is a schematic, diagrammatic view of a sports object such as a golf ball 120 being struck by an implement such as a club head or club face 1210, in accordance with at least one embodiment of the present disclosure. In a first frame n, the golf ball 120, at a position $X_n$, $Y_n$, $Z_n$, has been contacted by the club head 1510. In a second frame n+1, the golf ball 120 has taken flight and is at a position $X_{n+1}$, $Y_{n+1}$, $Z_{n+1}$, which differs from $X_n$, $Y_n$, $Z_n$, by an amount ΔX, ΔY, ΔZ. The distance M between the two golf ball positions is then the root-sum-square of these amounts, or $\sqrt{\Delta X^2+\Delta Y^2+\Delta Z^2}$. In some cases, the speed of a golf ball when struck may exceed 210 miles per hour, which, for a 60 Hz frame rate, equates to a distance M of 5.1 feet per frame. Because the frame rate and sensor field of view may be insufficient to fully capture such motion, in some embodiments, the golf ball's speed and other motion parameters are estimated based on the motion of the club, including such motion parameters as club head speed and an estimated, average, or typical smash factor.

In some cases, a mark 1610 on the ball 120 may be visible in both frame n and frame n+1, and the changing position of the mark 1610 can be used to calculate the spin of the ball, including such parameters as spin rate, spin direction, and total spin. These motion parameters, combined with the ball speed or velocity vector, can be used to determine additional flight characteristics such as Launch angle, carry, total distance, offline, descent angle, side angle, and/or peak height.

Figure 17:
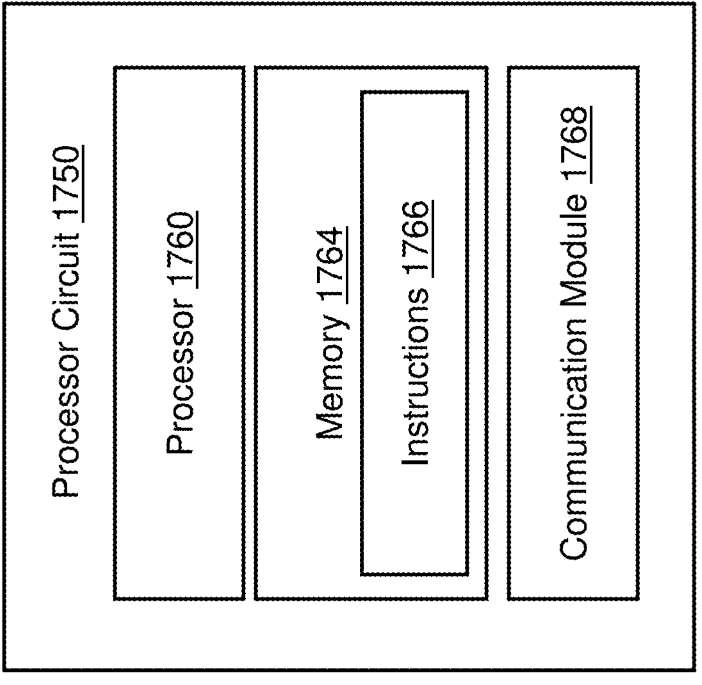
FIG. 17 is a schematic diagram of a processor circuit, in accordance with at least one embodiment of the present disclosure.

FIG. 17 is a schematic diagram of a processor circuit 1750, in accordance with at least one embodiment of the present disclosure. The processor circuit 1750 may be implemented in the SMODLaM 1100, or other devices or workstations (e.g., third-party workstations, network routers, etc.), or on a cloud processor or other remote processing unit, as necessary to implement the method. As shown, the processor circuit 1750 may include a processor 1760, a memory 1764, and a communication module 1768. These elements may be in direct or indirect communication with each other, for example via one or more buses.

The processor 1760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1760 may also comprise another hardware device, a firmware device, or any combination thereof configured to perform the operations described herein. The processor 1760 may also be implemented as a combination of computing devices, e.g., a combination of a DSP and a microprocessor, a plurality of microprocessors, one or more microprocessors in conjunction with a DSP core, or any other such configuration.

The memory 1764 may include a cache memory (e.g., a cache memory of the processor 1760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1764 includes a non-transitory computer-readable medium. The memory 1764 may store instructions 1766. The instructions 1766 may include instructions that, when executed by the processor 1760, cause the processor 1760 to perform the operations described herein. Instructions 1766 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1768 can include any electronic circuitry and/or logic circuitry to facilitate direct or indirect communication of data between the processor circuit 1750, and other processors or devices. In that regard, the communication module 1768 can be an input/output (I/O) device. In some instances, the communication module 1768 facilitates direct or indirect communication between various elements of the processor circuit 1750 and/or the SMODLaM 1100. The communication module 1768 may communicate within the processor circuit 1750 through numerous methods or protocols. Serial communication protocols may include but are not limited to United States Serial Protocol Interface (US SPI), Inter-Integrated Circuit (I2C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, data sharing between the processor and central server, or readings from the cameras or other sensors) may be accomplished using any suitable wireless or wired communication technology, such as a cable interface such as a universal serial bus (USB), micro USB, Lightning, or Fire Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 18:
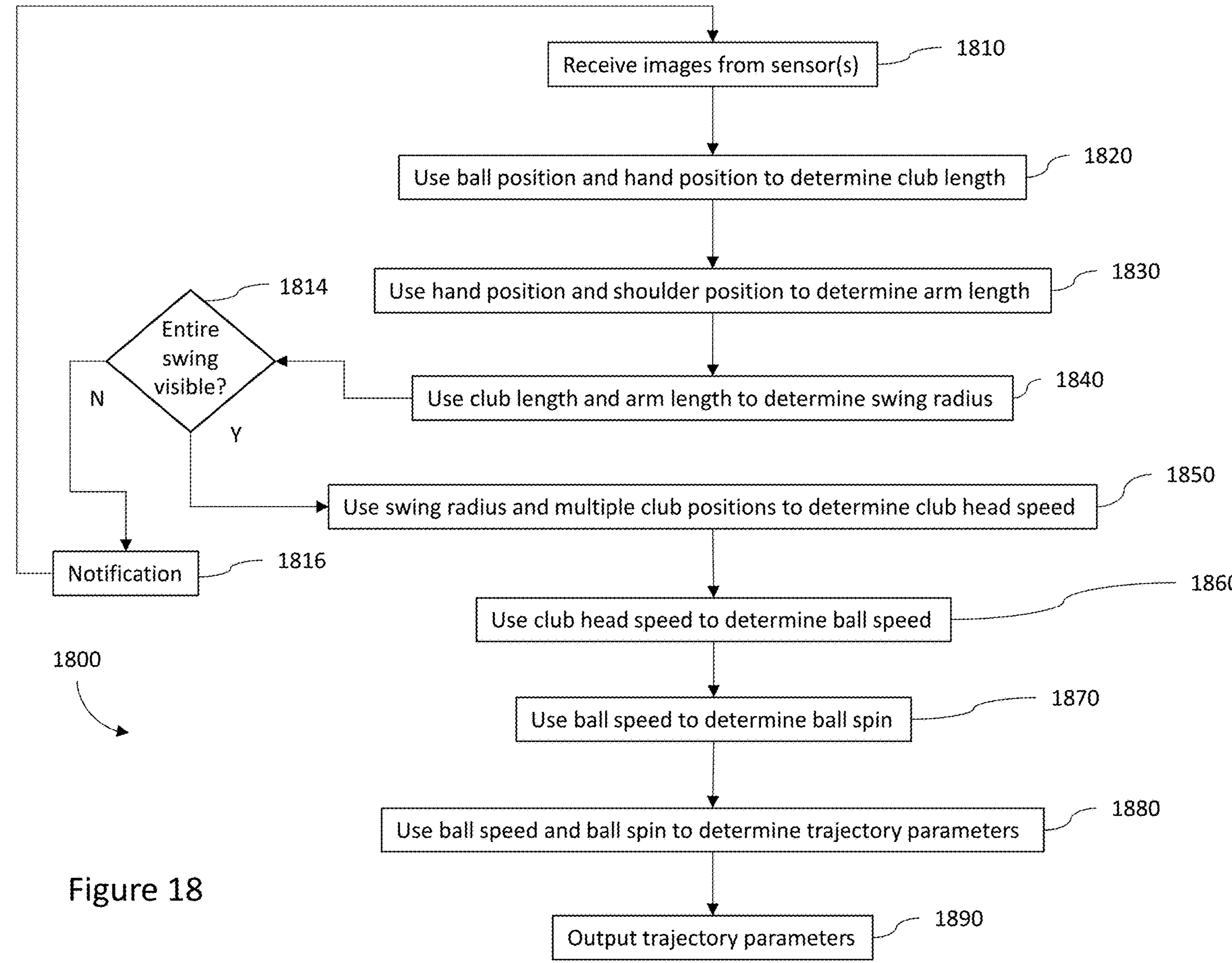
FIG. 18 is a schematic, diagrammatic representation, in flow diagram form, of an example single mobile device launch monitoring and motion capture method, in accordance with at least one embodiment of the present disclosure.

FIG. 18 is a schematic, diagrammatic representation, in flow diagram form, of an example single mobile device launch monitoring and motion capture method 1800, in accordance with at least one embodiment of the present disclosure.

In step 1810, the method 1800 involves receiving a sequence of images from the mobile device's sensors. The images may for example include the ball and club, and at least a portion of the golfer (e.g., the hands and shoulders). Preferably, the images include the golfer's entire body, such that a complete kinematic model of the golfer's body may be determined. Execution then proceeds to step 1820.

In step 1814, the method 1800 includes determining whether the golfer's entire swing is visible in the sequence of images (e.g., if every image does not contain the entire golf club), or it is estimated that the golfer's entire swing will be visible in the sequence of images. If Yes, execution proceeds to step 1850. If No, execution proceeds to step 1816.

Is step 1816, the method 1800 includes issuing an alert, warning, or notification to the user as described above in FIG. 15. Execution then returns to step 1810 after the user has re-positioned the mobile device.

In step 1820, the method 1800 includes identifying the club as a diagonal line in view of the mobile device camera(s), identifying the ball as a color-contrasted white object (e.g., a circle) at the bottom of the diagonal line, and identifying the user's hands as a position along the diagonal line where the line shape becomes irregular. In some cases (e.g., with multiple 2D cameras, a 3D camera arrangement, or a depth sensor), the distances from the camera(s) to the club, ball, and hands are known or can be determined trigonometrically. In other cases (e.g., with a single 2D camera), the distances from the camera to the club, ball, and hands may be estimated (e.g., based on instructions given to the user regarding placement of the mobile device). The club length can then be estimated as the distance, along the diagonal line, between the user's hands and the ball. Execution then proceeds to step 1830.

In step 1830, the method 1800 includes identifying the user's shoulders (e.g., as a location just below where the user's body narrows due to the neck), determining a distance to or location of the user's shoulders, and then determining the length of the user's arms as the distance between the user's shoulders and the user's hands. Execution then proceeds to step 1840.

In step 1840, the method 1800 includes using the club length and the user's arm length to determine the swing radius. In some cases, the swing radius is a simple sum of the club length and arm length. Execution then proceeds to step 1814.

In step 1850, the method 1800 includes using the swing radius, along with multiple images of the club head at different points during the swing, to determine the club head speed. Execution then proceeds to step 1860.

In step 1860, in some embodiments, the method 1800 includes using the club head speed and multiple images of the ball at different points during the swing, to determine the ball speed. In other embodiments, the method includes using the club head speed and a measured, computed, or average smash factor to determine the ball speed (e.g., as club speed multiplied by the smash factor). Execution then proceeds to step 1870.

In step 1870, the method 1800 includes using the ball speed and multiple images of a mark on the ball at different times during the swing to determine the ball spin (e.g., spin rate, spin direction, total spin, etc.). Execution then proceeds to step 1880.

In step 1880, the method 1800 includes using the ball speed and ball spin to predict or simulate the trajectory, and use the predicted or simulated trajectory to determine trajectory parameters such as launch angle, carry, total distance, offline, descent angle, side angle or azimuth, and/or peak height. Execution then proceeds to step 1890.

In step 1890, the method 1800 includes outputting the trajectory parameters to the user. This output may for example be in the form of text, images, or symbols on the touchscreen of the mobile device, or may be auditory, printed on a printer, or otherwise. The method 1800 is now complete.

Figure 19:
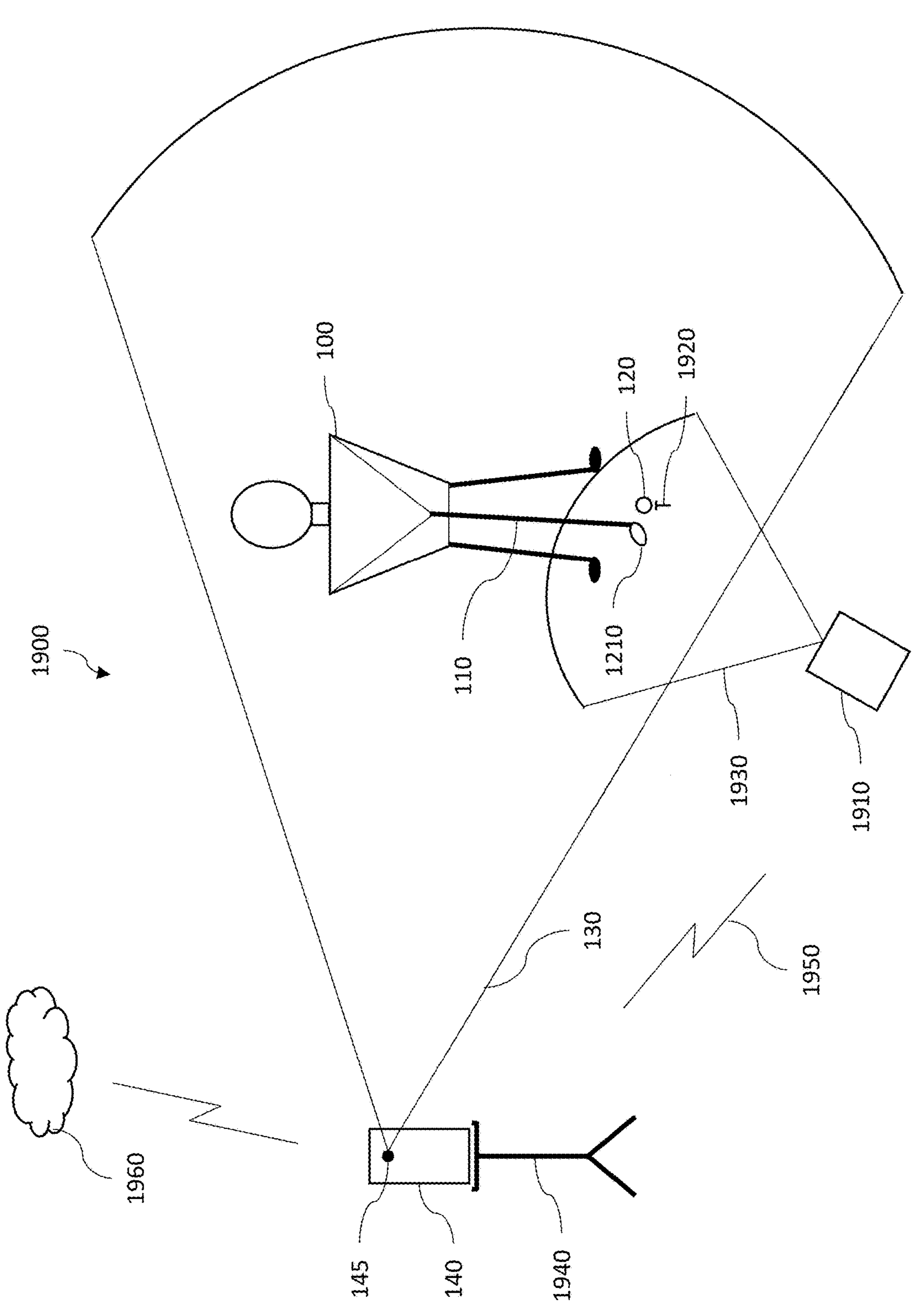
FIG. 19 is a side perspective view of a user hitting a golf ball with a golf club, within view of a Single Mobile Device Launch Monitor and Motion Capture (SMODLaM), with an additional camera, in accordance with at least one embodiment of the present disclosure.

FIG. 19 is a schematic, diagrammatic view of a golfer 100 in the viewing cone 130 of a sensor 145 of the mobile device 140 of a SMODLaM system 1900, in accordance with at least one embodiment of the present disclosure. Visible are the club 110, club head 1210, and ball 120, which is resting on a tee 1920. The sensor 140 may be a 2D camera, a 3D camera pair, a depth-sensing 3D camera, or a depth-sensing LIDAR, and may have a frame rate typical of mobile device sensors, such as 30 fps or 30 fps, although other values both larger and smaller may be used instead or in addition. The mobile device 140 is shown resting on a stand 1940 that elevates it off the ground and keeps it oriented toward the golfer 100, although in some cases the stand 1940 may not be needed.

In the example shown in FIG. 19, the club head 1210 and ball 120 are also within the viewing cone 1930 of an external sensor 1910, which may for example be 2D camera, a 3D camera pair, a depth-sensing 3D camera, or a depth-sensing LIDAR. By providing a second view of the club head 1210 and ball 120, the external sensor 1910 allows for a more accurate measurement or estimate of the positions and velocity vectors of the club head 1210 and ball 120 in 3D space. The external sensor 1910 may be a high-speed sensor (e.g., a high-speed video camera) with a frame rate of 1000 fps, 2000 fps, or other values higher or lower, such that the external camera 1910 is able to capture multiple views of the club head 1210 during the swing, as well as multiple views of the ball 120 during release and flight.

In some instances, the speed of the club head 1210 can exceed 140 miles per hour, which at a 1000-Hz frame rate equates to a movement of 0.2 feet (or 2.46 inches) per frame. In some cases, the speed of a golf ball when struck may exceed 210 miles per hour, which at a 1000-Hz frame rate equates to a movement of 0.3 feet (or 3.7 inches) per frame. Thus, the external sensor 1910 may capture movement of the club head 1210 and ball 120, including the spin of the ball 120, with greater precision than the mobile device sensor 145, thus allowing for a more accurate and detailed prediction or simulation of the trajectory of the ball 120, and thus of the motion parameters or flight parameters of the ball. In the example shown in FIG. 19, the external sensor 1910 is positioned on the floor or ground near the golfer 100. However, in some instances it may be oriented, elevated, or otherwise supported by a stand of its own. These viewing angles have the advantage of being achievable indoors or outdoors, in setting such as golf courses, driving ranges, back yards, gymnasiums, training rooms, etc. In some cases, a net or screen may be used to arrest motion of the ball after a few feet of flight, although in outdoor settings this may not be necessary. If motion of the ball is arrested, the SMoDLaM system 1900 may calculate, estimate, or simulate the trajectory of the ball as though it had not been arrested.

In an example, the mobile device 140 is in communication with the external sensor 1910 via a wired or wireless communication link 1950. The link 1950 may for example be a Bluetooth, WiFi, USB, USB-C, or other wired or wireless link. Depending on the implementation, the external sensor 1910 may communicate image frames or other data to the mobile device in real time, or may, when commanded by the mobile device 140, store image frames for a period of time (e.g., several seconds) and then communicate them to the mobile device 140.

Combining the hardware (video capture and/or lidar) and firmware from a mobile device with a WiFi, Bluetooth, or wired connection to an camera or multiple external cameras gives ample data for combination to recreate the path of the club before, during, and after impact as well as the initial flight of the ball and/or the swing motion to deliver kinematics and kinetics. The mobile device views the golfer and the club throughout the entire swing. Potentially, the multiple cameras on the mobile device can be used to focus on different areas. For example, one camera may be focused on the player and club, another zoomed in to focus mainly on the club to more closely detail the club's last 2 feet of travel before impact with the ball, impact with the ball, and 2 feet of ball and club head after impact. As lidar improves in mobile devices, the lidar and high speed video from the multiple sensors provide "down the target line" data for computing 1 dimension of club and ball X,Y,Z coordinates.

Simultaneously, using the external sensor (which may for example be another mobile device, a sensor of another mobile device, or a dedicated/slaved high speed camera and/or lidar device) focused acutely on the last 2' of club travel, impact, and 2' after impact provide data from another perspective. That data may for example be collected via lidar or high speed video. The multiple angles of data taken simultaneously allow for reconstruction of the club and ball data with greater fidelity than the mobile device alone.

The "down the line" mobile device may calculate the flight parameters locally, or may communicate with a cloud based service 1960 for at least a portion of the computation. The external camera/lidar device, located near the ball. In some implementations, multiple cameras can be used, for example to allow for both right handed and left handed golfers to play without moving the camera setups to accommodate the ball location change.

Figure 20:
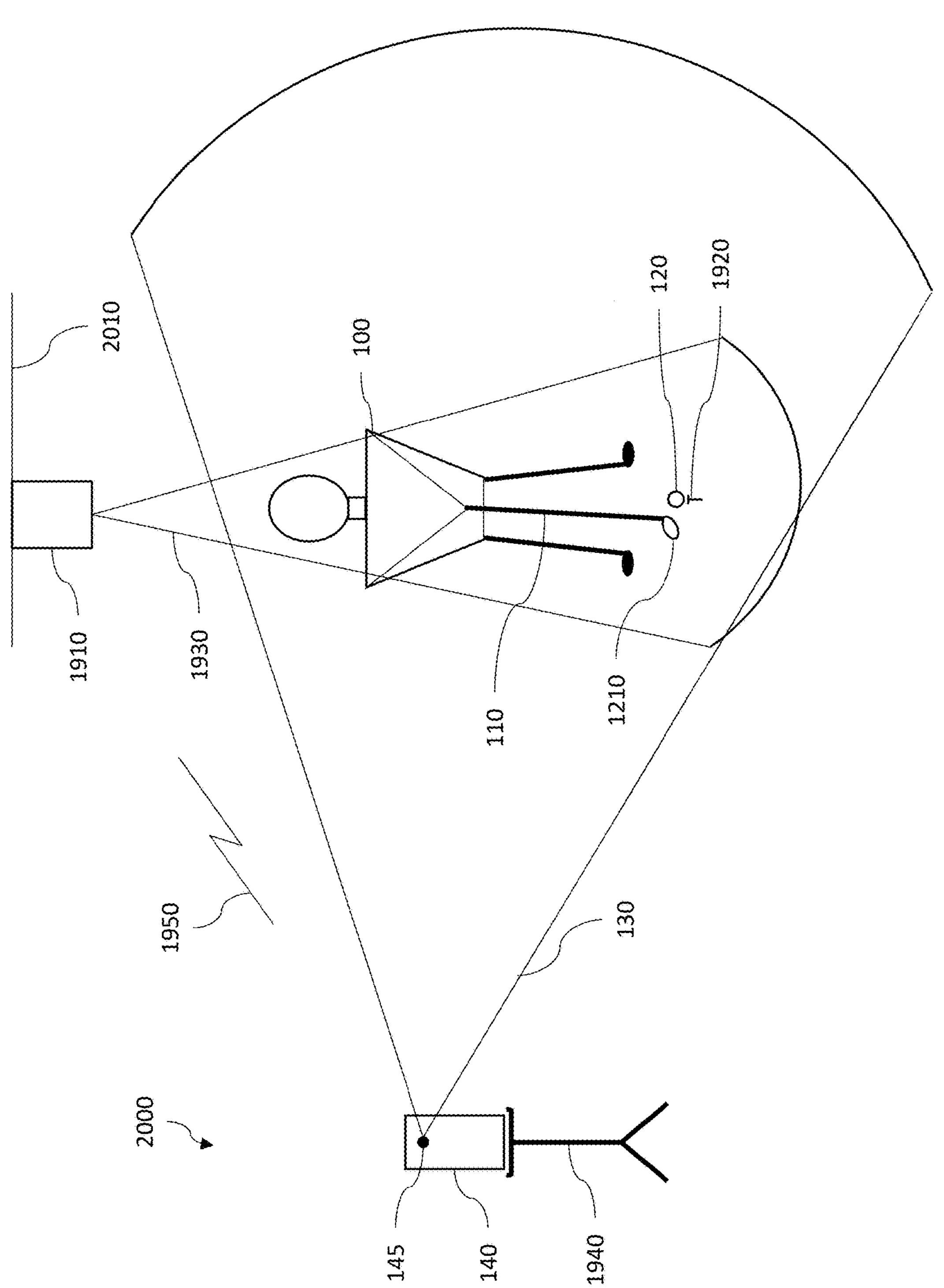
FIG. 20 is a side perspective view of a user hitting a golf ball with a golf club, within view of a Single Mobile Device Launch Monitor and Motion Capture (SMODLaM), with an additional camera, in accordance with at least one embodiment of the present disclosure.

FIG. 20 is a schematic, diagrammatic view of a golfer 100 in the viewing cone 130 of a sensor 145 of the mobile device 140 of a SMODLaM system 2000, in accordance with at least one embodiment of the present disclosure. The SMODLaM system 2000 is similar to the SMODLaM system 1900 of FIG. 19, except that the external sensor 1900 is ceiling mounted. Thus, the field of view 130 of the mobile device sensor 145 is looking generally horizontally down the fairway in the direction of the shot, and encompasses at least the golfer 100, club 110, club head 1210, and ball 120, whereas the field of view 1930 of the external sensor is looking generally vertically down at the golfer 100, and encompasses at least the club head 1210 and ball 120. These views may be most easily achieved indoors, and may require attachment of the external sensor to a ceiling or other overhead structure 2010. In some circumstances, these views may be advantageous for accurate measurement or estimation of the positions and velocities of the club head 1210 and ball 120, as well as the spin of the ball 120.

Figure 21:
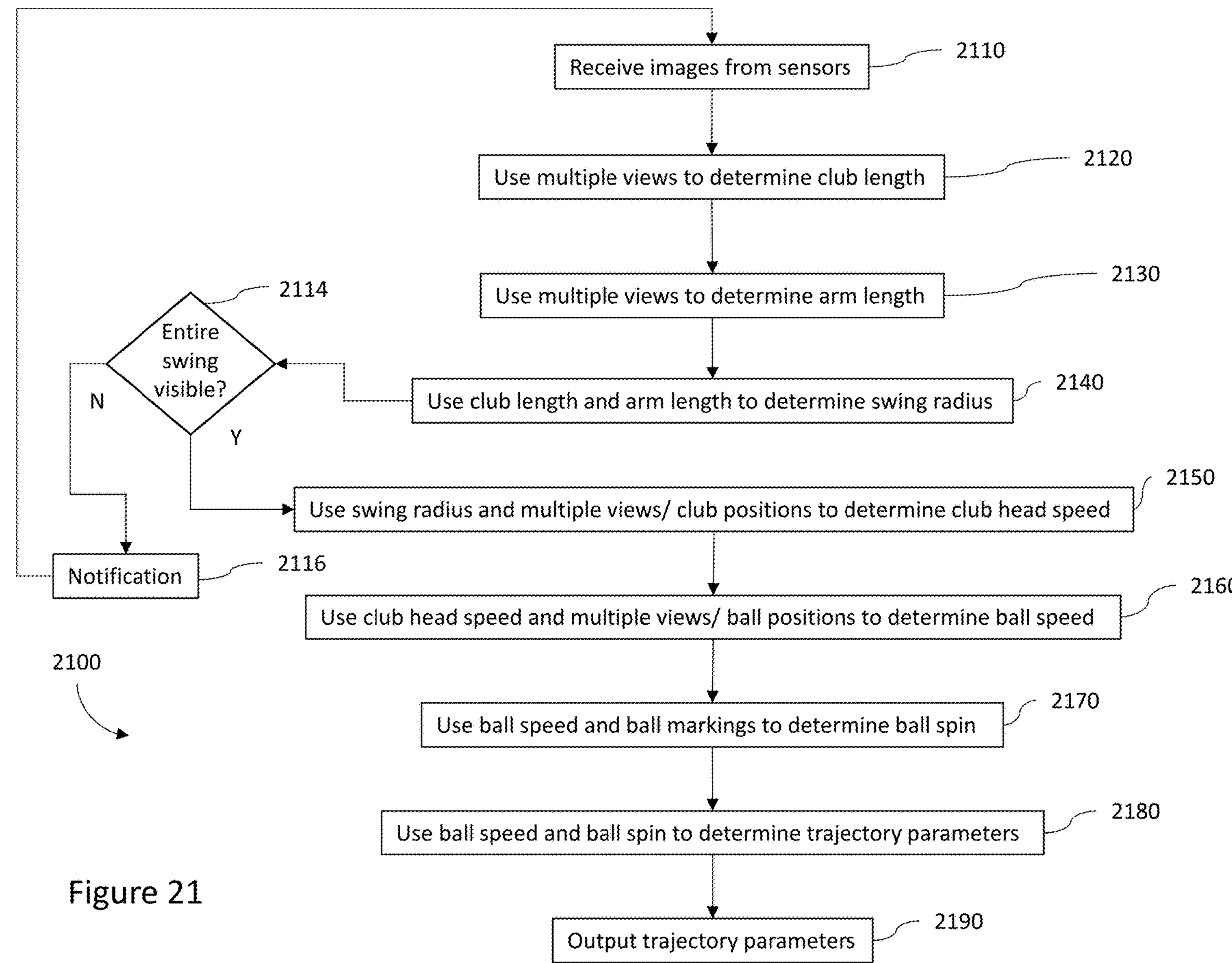
FIG. 21 is a schematic, diagrammatic representation, in flow diagram form, of an example single mobile device launch monitoring and motion capture method, in accordance with at least one embodiment of the present disclosure.

FIG. 21 is a schematic, diagrammatic representation, in flow diagram form, of an example single mobile device launch monitoring and motion capture method 2100, in accordance with at least one embodiment of the present disclosure.

In step 2110, the method 2100 involves receiving a sequence of images from the mobile device's sensors and from the external sensor. The images from the mobile device's sensor(s) may for example include the ball and club, and at least a portion of the golfer (e.g., the hands and shoulders). Preferably, the images include the golfer's entire body, such that a complete kinematic model of the golfer's body may be determined. The images from the external sensor may for example include the club head and the ball. Execution then proceeds to step 2120.

In step 1814, the method 2100 includes determining whether the golfer's entire swing is visible in the sequence of images (e.g., if every image captured by the mobile device camera does not contain the entire golf club, or if every image captured by the external sensor does not include the club head), or it is estimated that the golfer's entire swing will be visible in the sequence of images. If Yes, execution proceeds to step 2150. If No, execution proceeds to step 2116.

Is step 2116, the method 2100 includes issuing an alert, warning, or notification to the user to reposition or reorient the mobile device, the external sensor, or both. Alternatively, the notification may instruct the user to reposition themselves in relation to the mobile device and/or the external sensor. Execution then returns to step 2110 after any advised repositioning is complete.

In step 2120, the method 2100 includes identifying the club as a diagonal line in view of the cameras, identifying the ball as a color-contrasted light object (e.g., a circle) at the bottom of the diagonal line, and identifying the user's hands as a position along the diagonal line where the line shape becomes irregular. By triangulating the views from the mobile device sensor and the external sensor, the distances from the cameras to the club, ball, and hands are can be determined trigonometrically. The club length can then be measured as the distance, along the diagonal line, between the user's hands and the ball. Execution then proceeds to step 2130.

In step 2130, the method 2100 includes identifying the user's shoulders (e.g., as a location just below where the user's body narrows due to the neck), determining a distance to or location of the user's shoulders, and then determining the length of the user's arms as the distance between the user's shoulders and the user's hands. Execution then proceeds to step 2140.

In step 2140, the method 2100 includes using the club length and the user's arm length to determine the swing radius. In some cases, the swing radius is a simple sum of the club length and arm length. Execution then proceeds to step 2114.

In step 2150, the method 2100 includes using multiple images of the club head at different points during the swing, from both the mobile device sensor and the external sensor, to determine the club head position and velocity vector. Execution then proceeds to step 2160.

In step 2160, in some embodiments, the method 2100 includes using the club head speed and multiple images of the ball at different points during the swing and release, from both the mobile device sensor and the external sensor, to determine the position and velocity vector of the ball. Execution then proceeds to step 2170.

In step 2170, the method 2100 includes using the ball speed and multiple images of a mark on the ball at different times during the swing and release to determine the ball spin (e.g., spin rate, spin direction, total spin, etc.). Execution then proceeds to step 2180.

In step 2180, the method 2100 includes using the ball speed and ball spin to predict or simulate the trajectory, and use the predicted or simulated trajectory to determine trajectory parameters such as launch angle, carry, total distance, offline, descent angle, side angle or azimuth, and/or peak height. Execution then proceeds to step 2190.

In step 1890, the method 1800 includes outputting the trajectory parameters to the user. This output may for example be in the form of text, images, or symbols on the touchscreen of the mobile device, or may be auditory, printed on a printer, or otherwise. The method 2100 is now complete.

Depending on the implementation, steps 2120-2140 may be necessary for the performance of steps 2114 and 2116, but may be unnecessary or optional for the performance of steps 2150-2190.

In various instances, parts of the method may be implemented in modules, subroutines, or other computing structures. In many embodiments, the method and software embodying the method may be recorded on a fixed tangible medium.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the Single Mobile Device Launch Monitor and Motion Capture. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the Single Mobile Device Launch Monitor and Motion Capture as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

The invention claimed is:

1. A system for determining a trajectory of a sport object propelled via an implement using a single mobile device, the system comprising:

a smartphone or tablet;

a first sensor disposed within the smartphone or tablet;

a swing radius module running on the smartphone or tablet, the swing radius module calculating a swing radius of an implement swung by a user based on sensor data obtained from the first sensor;

a notification module running on the smartphone or tablet, the notification module providing a notification to the user whether a portion of the swing radius is outside of a viewing frame of the first sensor; and a second sensor disposed at a known distance from the first sensor, wherein the second sensor is separate from the smartphone or tablet and in wired or wireless communication with the smartphone or tablet.

2. The system of claim 1, wherein the sport object is a golf ball and the implement swung by the user is a golf club.

3. The system of claim 2, wherein, based on the entire swing radius being inside of the viewing frame of the first sensor, the smartphone or tablet calculates, based on the swing radius and the sensor data obtained from the first sensor, a ball speed after the golf club makes contact with the golf ball.

4. The system of claim 3, wherein, based on the entire swing radius being inside of the viewing frame of the first sensor, the smartphone or tablet calculates, based on the ball speed and the sensor data obtained from the first sensor, a ball spin rate and ball spin direction after the golf club makes contact with the golf ball.

5. The system of claim 4, wherein the first sensor and second sensor are cameras, and wherein a magnification of the first camera and a magnification of the second camera are known.

6. The system of claim 5, further comprising a trajectory module configured to, based on the entire swing radius being inside of the viewing frame of the first sensor, using the ball speed, the ball spin rate, and the ball spin direction, correlate images from the first camera and the second camera using the known distances and magnifications of the first camera and the second camera to compute a trajectory of the sport object.

7. The system of claim 1, further comprising a pre-swing detection system running on the smartphone or tablet that calculates a length of a golf club based on the sensor data obtained from the first sensor.

8. The system of claim 7, wherein the pre-swing detection system calculates a length of the user's arms based on the sensor data obtained from the first sensor.

9. The system of claim 8, wherein the swing radius module calculates the swing radius based at least in part on the length of the golf club and the length of the user's arms.

10. The system of claim 1, wherein if the notification module indicates that a portion of the swing radius is outside the viewing frame of the first sensor, the user is notified to reposition the smartphone or tablet.

11. A system for determining a trajectory of a sport object propelled via an implement using a mobile device, the system comprising:

a smartphone or tablet;

a first sensor disposed within the smartphone or tablet;

a second sensor separate from the smartphone or tablet and in wired or wireless communication with the smartphone or tablet, wherein a first-second inter-sensor distance between the first sensor and the second sensor is known;

swing radius module configured to determine whether the entire swing radius of the implement is within a viewing frame of the first sensor; and a trajectory module configured to, based on the entire swing radius of the implement being within a viewing frame of the first sensor using the swing radius, correlate images from the first sensor and the second sensor using the first-second inter-sensor distance to compute a trajectory of the sport object.

12. The system of claim 11, wherein the first sensor and second sensor are cameras.

13. The system of claim 11, wherein a first magnification of the first sensor and a second magnification of the second sensor is known and the first and second magnifications are used by the trajectory module in correlating the images.

14. The system of claim 11, further comprising a pre-swing detection system that calculates a length of the implement, wherein the implement is a golf club.

15. The system of claim 14, wherein the pre-swing detection system calculates an arm length of a user of the implement.

16. The system of claim 15, wherein the swing radius module is further configured to compute the swing radius of the implement based in part on the length of the implement and the arm length of the user.

17. The system of claim 16, further comprising a notification module, the notification module providing a notification to a user that a portion of the swing radius of the implement is outside of a viewing frame of the first sensor.

18. The system of claim 17, wherein if the notification module indicates that the swing radius is outside the viewing frame of the sensor, the user is notified to reposition the single mobile device.

19. A system for determining a trajectory of a sport object propelled via an implement using a smartphone or tablet, the system comprising:

software running on the smartphone or tablet and configured to communicate with a first sensor disposed on the smartphone or tablet;

a second sensor separate from the smartphone or tablet, wherein a first-second inter-sensor distance between the first sensor and the second sensor is known;

a swing radius module of the software, the swing radius module calculating, based on the images from the first sensor and the second sensor, a swing radius of an implement swung by a user;

a trajectory module of the software configured to based on the entire swing radius being within a viewing frame of the first sensor, correlate images from the first sensor and the second sensor using the first-second inter-sensor distance to compute a trajectory of the sport object;

and a notification module of the software, the notification module providing a notification to the user the swing radius is outside of a viewing frame of the sensor.

* * * * *